US012584657B2

(12) United States Patent (10) Patent No.: US 12,584,657 B2
Hirota et al. (45) Date of Patent: Mar. 24, 2026

(54) WATER HEATER WITH WIRELESS COMMUNICATION PART

(71) Applicant: NORITZ CORPORATION, Hyogo (JP)

(72) Inventors: Daisuke Hirota, Akashi (JP); Hiroshi Yokoyama, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 95 days.

(21) Appl. No.: 18/655,296

(22) Filed: May 5, 2024

(65) Prior Publication Data

US 2024/0384896 A1 Nov. 21, 2024

(30) Foreign Application Priority Data

May 19, 2023 (JP) ................................. 2023-082858

(51) Int. Cl.
*H04W 12/06* (2021.01)
*F24H 15/464* (2022.01)
(52) U.S. Cl.
CPC .......... *F24H 15/464* (2022.01); *H04W 12/06* (2013.01)
(58) Field of Classification Search
CPC ............................. F24H 15/464; H04W 12/06
See application file for complete search history.

(56) References Cited

U.S. PATENT DOCUMENTS

| | | | | |
|---|---|---|---|---|
| 2014/0362991 A1* | 12/2014 | Ebrom | .................. | H04W 12/64 |
| | | | | 380/270 |
| 2020/0107273 A1* | 4/2020 | Kyou | .................... | H04W 52/50 |
| 2021/0250879 A1* | 8/2021 | Choi | ................... | H04W 52/383 |
| 2022/0181918 A1* | 6/2022 | Hiramatsu | ............. | H02J 50/60 |
| 2022/0182102 A1* | 6/2022 | Park | ........................ | H02J 50/80 |
| 2023/0354218 A1* | 11/2023 | Lee | ........................ | H04W 52/54 |

FOREIGN PATENT DOCUMENTS

| | | |
|---|---|---|
| JP | 2013157896 | 8/2013 |
| JP | 2020112319 | 7/2020 |

* cited by examiner

*Primary Examiner* — Viet D Vu
(74) *Attorney, Agent, or Firm* — JCIPRNET

(57) ABSTRACT

A water heater performs short-range wireless communication with an external device such as a mobile communication terminal in a manner that automatically authenticates the external device to be connected in response to establishment of communication connection. The transmission output of short-range wireless communication from the water heater is set to first output before establishment of communication connection with the external device, and is increased from the first output to second output when communication connection with the external device is established. Further, the transmission output of short-range wireless communication from the water heater is maintained at the second output and stands by for reconnection with the external device until a reference time lapses when communication connection with the external device once communicatively connected is disconnected, and is decreased from the second output to the first output when the reconnection is not established even after the reference time elapses.

6 Claims, 4 Drawing Sheets

WATER HEATER WITH WIRELESS COMMUNICATION PART

CROSS-REFERENCE TO RELATED APPLICATION

This application claims the priority benefits of Japanese application no. 2023-082858, filed on May 19, 2023. The entirety of the above-mentioned patent application is hereby incorporated by reference herein and made a part of this specification.

BACKGROUND

Technical Field

The disclosure relates to a water heater, and more particularly, relates to a water heater having a short-range wireless communication function.

Description of Related Art

Japanese Patent Application Laid-Open No. 2020-112319 (Patent Document 1) describes a configuration which, in a communication system including a kitchen device such as a heating cooker, a mobile terminal, a hot water supply remote control, and a server, performs communication (BT communication) by a Bluetooth (registered trademark) system between the heating cooker, the mobile terminal, and the hot water supply remote control, and in which the hot water supply remote control communicatively connects to the server via the Internet by performing communication (Wi-Fi communication) by a WiFi (registered trademark) system.

Patent Document 1 describes that, in the above communication system, the recipe data stored in the server is transmitted to the heating cooker via the hot water supply remote control that operates as a relay device when BT communication is established between the hot water supply remote control and the heating cooker. It is also described that a device placed near the heating cooker, such as a range hood, may be used as a relay device instead of the hot water supply remote control.

In addition, Japanese Patent Application Laid-Open No. 2013-157896 (Patent Document 2) describes that, in short-range wireless communication with a plurality of electronic devices that have been paired in advance, the order of reconnection is controlled based on the signal strength at the time of pairing.

Short-range wireless communication is generally performed between paired devices. However, unlike the remote control for a water heater, the water heater main body generally lacks a user interface for displaying information such as characters. Therefore, when establishing short-range wireless communication between the water heater main body and an external device, it is difficult to perform pairing using a one-time passcode.

On the other hand, in a mode where the water heater main body and the external device are communicatively connected by pairing without using a passcode, security is a concern for electronic devices within the range of radio waves are able to communicate with the water heater.

However, if the range of radio waves from the water heater is narrowed for security reasons, there is a concern that, during installation work that involves communication connection with the water heater main body, the communication connection once established may be frequently disconnected due to movement of the external device, resulting in a decrease in convenience. On the other hand, even though the range of radio waves may be simply switched before and after communication connection is established, it is inconvenient to reconnect after the communication connection is disconnected.

The disclosure achieves both security and convenience in short-range wireless communication with a water heater through pairing that does not involve inputting a passcode.

SUMMARY

In one aspect of the disclosure, a water heater includes: a communication part for short-range wireless communication with an external device; and a controller that controls transmission output of the short-range wireless communication performed by the communication part. The communication part is configured to automatically authenticate the external device to be connected in response to establishment of communication connection of the short-range wireless communication. The controller sets the transmission output to first output before establishment of communication connection with the external device, and increases the transmission output from the first output to second output in response to communication connection with the external device being established. Further, the controller maintains the transmission output at the second output and stands by for reconnection with the external device until a reference time elapses in response to communication connection with the external device once communicatively connected being disconnected, and decreases the transmission output from the second output to the first output in a case where the reconnection is not established even after the reference time elapses.

According to the disclosure, it is possible to achieve both security and convenience by controlling the transmission output of short-range wireless communication in short-range wireless communication with a water heater through pairing that does not involve inputting a passcode.

DESCRIPTION OF THE EMBODIMENTS

Figure 1:
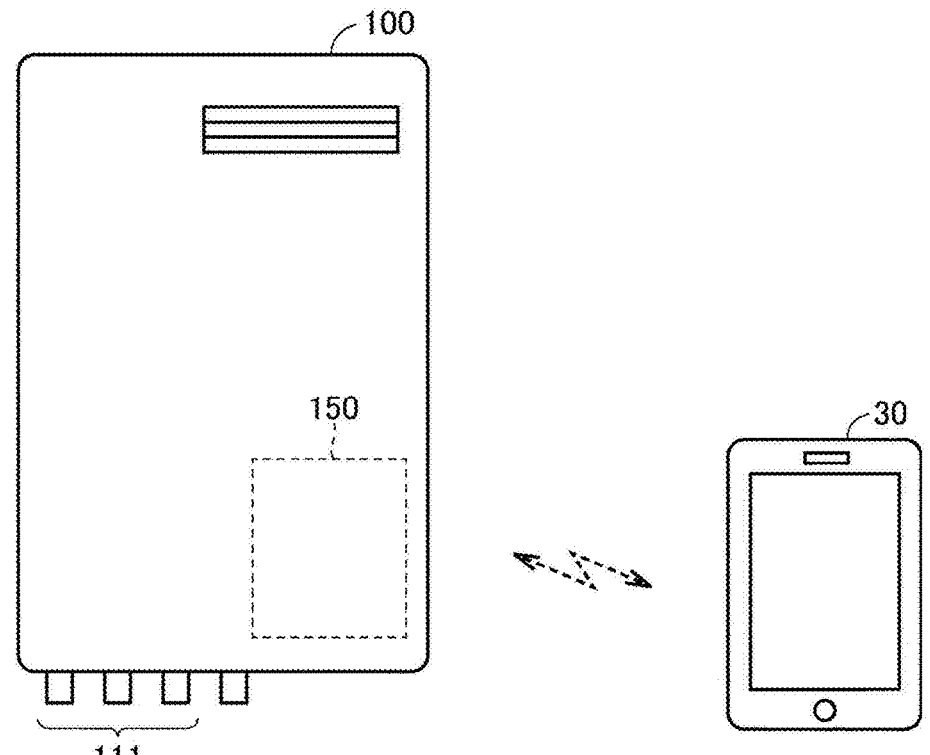
FIG. 1 is a conceptual diagram illustrating the communication connection manner between the water heater and the external device according to this embodiment.

Embodiments of the disclosure will be described in detail below with reference to the drawings. Hereinafter, the same or corresponding parts in the drawings are denoted by the same reference numerals, and the description thereof will not be repeated in principle.

FIG. 1 is a conceptual diagram illustrating a communication connection manner between a water heater and an external device according to this embodiment.

Referring to FIG. 1, the water heater 100 according to this embodiment supplies heated hot water to a hot water supply destination via piping connected to a plurality of hot water supply ports 111. For example, the hot water supply destination includes a sink and a bathtub (not shown). Alternatively, the hot water supply destination includes a room heater (not shown) that uses high-temperature water as a heat source, enabling the water heater 100 to have a heating function.

A circuit board 150 is installed inside the water heater 100. A circuit group (which will be described later) for driving and controlling the water heater 100 is mounted on the circuit board 150. Furthermore, the water heater 100 has a short-range wireless communication function for communication according to BLE (Bluetooth Low Energy (registered trademark)) or the like (hereinafter referred to as BLE communication), and is configured to be communicatively connectable with an "external device" having a short-range wireless communication function, which is typified by a mobile communication terminal 30 such as a smartphone or a tablet.

Figure 2:
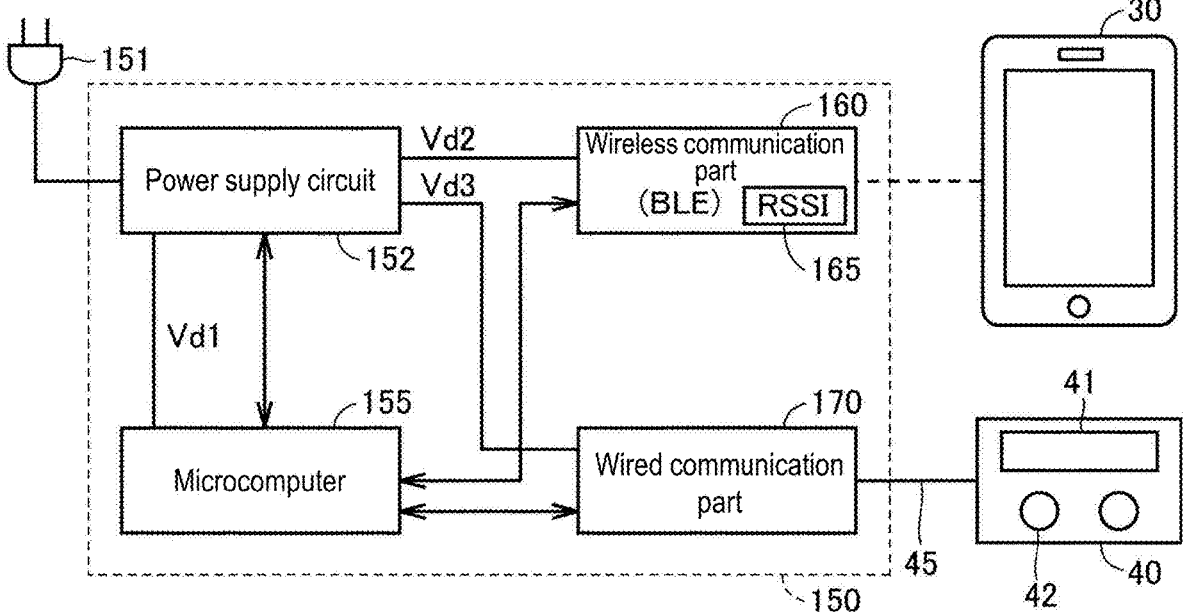
FIG. 2 is a block diagram illustrating the configuration for communication of the water heater according to this embodiment.

FIG. 2 shows a block diagram illustrating a configuration for communication of the water heater 100 shown in FIG. 1.

Referring to FIG. 2, a power supply circuit 152, a micro computer (also simply referred to as "microcomputer") 155 having a controller function, a wireless communication part 160, and a wired communication part 170 are mounted on the circuit board 150 shown in FIG. 1. In addition, the circuit board 150 may be an assembly of a plurality of boards on which some of the circuit elements shown in FIG. 2 are mounted.

The power supply circuit 152 generates power supply voltages for the constituent devices of the water heater 100 when an outlet 151 is connected to a power supply (for example, a commercial AC power supply) and the water heater 100 is turned on. In the example of FIG. 2, a power supply voltage Vd1 of the microcomputer 155, a power supply voltage Vd2 of the wireless communication part 160, and a power supply voltage Vd3 of the wired communication part 170 are generated by the power supply circuit 152. In addition, at least some of the microcomputer 155, the wireless communication part 160, and the wired communication part 170 may have a common power supply voltage.

The wired communication part 170 is connected by wired communication with a remote controller (hereinafter simply referred to as "remote control") 40 by a communication line (for example, a two-core communication line) 45. The remote control 40 has a display part 41 and an input part 42. By operating the input part 42 according to the screen displayed by the display part 41, the user can input settings related to the operation and function of the water heater 100, such as filling hot water and setting hot water supply temperature. The remote control 40 can be placed in the bathroom and/or the kitchen.

In order to operate the water heater 100 to supply hot water according to the user settings input to the remote control 40, the microcomputer 155 controls an electromagnetic valve (not shown) for controlling the supply of fuel gas to a combustion mechanism (not shown), and an air supply fan (not shown) for supplying air to be mixed with the fuel gas. The microcomputer 155 corresponds to an example of the "controller." The microcomputer 155 is configured to be able to transmit and receive data to and from each of the wireless communication part 160 and the wired communication part 170 on the circuit board 150.

The wireless communication part 160 has a short-range wireless communication function such as BLE communication. The wireless communication part 160 corresponds to an example of the "communication part" and can be configured by, for example, a BLE communication module. The wireless communication part 160 is provided with a detection part 165 for detecting received signal strength indicator (RSSI).

When installing the water heater 100, it is necessary to provide data such as information of the water heater 100 to an operator for initial settings. On the other hand, since the water heater 100 generally lacks a user interface such as character display, it is difficult to directly present the data to the operator.

Therefore, by transmitting the initial setting data stored in the microcomputer 155 of the water heater 100 to the mobile communication terminal 30 through short-range wireless communication between the mobile communication terminal 30 of the operator and the water heater 100, the data can be provided efficiently. In addition, the embodiment will be described hereinafter on the assumption that BLE communication is used as short-range wireless communication.

Short-range wireless communication such as BLE communication is performed between paired devices after pairing is performed between the devices that are communicatively connected. For pairing in this case, there are a passkey entry format that involves mutual authentication by inputting a passcode such as a one-time password, and a Just Works format that automatically authenticates the other end connected by wireless communication without inputting a passcode.

Since it is difficult to present a one-time password in terms of the user interface in the water heater 100 according to this embodiment, pairing authentication based on the Just Works format is adopted, which automatically authenticates the other end that is communicatively connected. Thus, pairing with the water heater 100 is possible as long as the mobile communication terminal 30 is located within the range where the radio waves of the BLE communication transmitted from the water heater 100 can reach, that is, within the communicatively connectable range.

Therefore, considering that the water heater 100 is often installed outdoors, if the above-mentioned range where radio waves can reach (communicatively connectable range) is set too wide, there is a concern that the security may be impaired.

On the other hand, if the range where the radio waves can reach (communicatively connectable range) is too narrow, there is a concern that the workability such as initial setting work using data transmitted from the water heater 100 may be reduced.

Thus, the water heater according to this embodiment performs transmission output control of BLE communication as described below.

Figure 3:
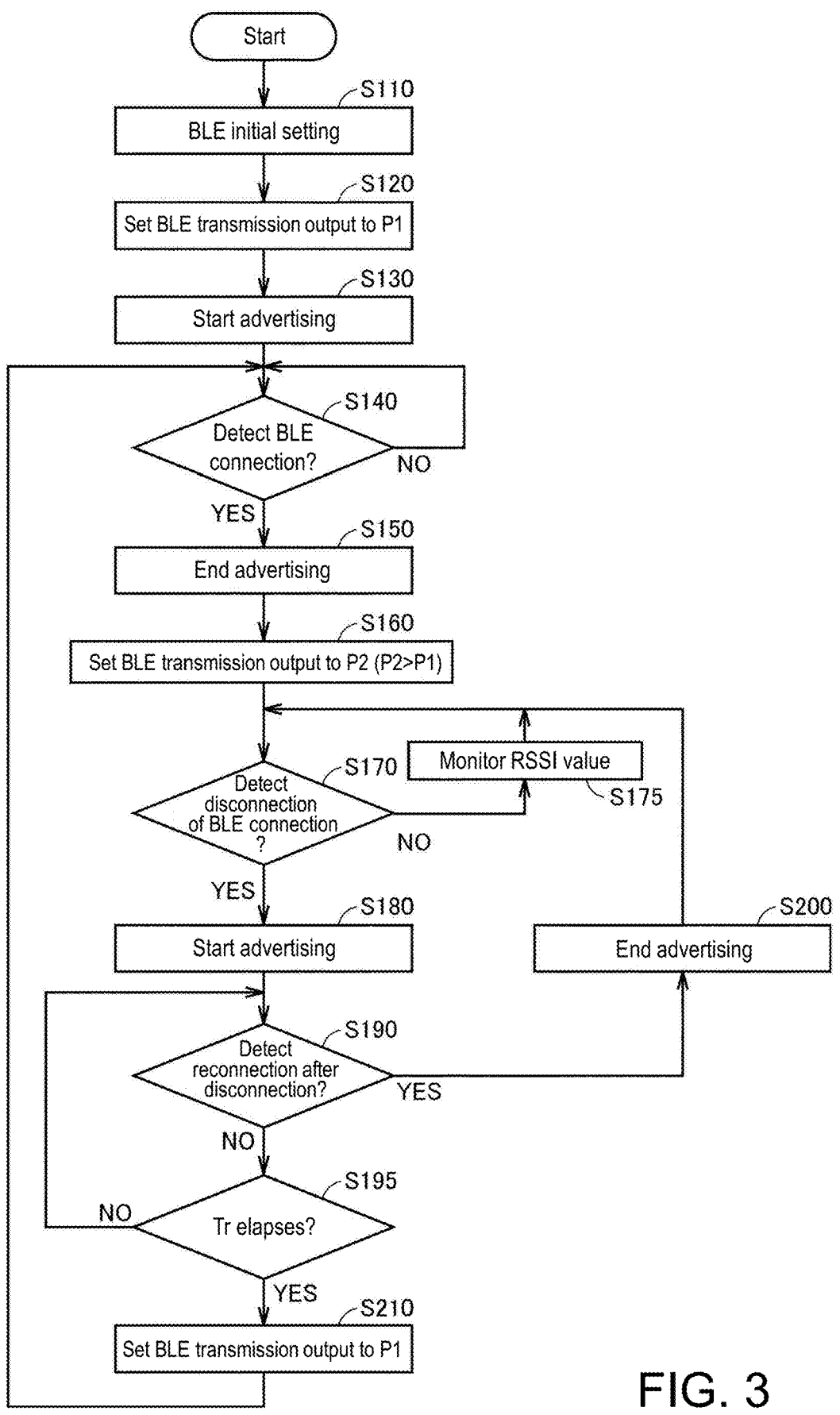
FIG. 3 is a flowchart illustrating the control processing for communication connection with the external device performed by the water heater according to this embodiment.
Figure 4A:
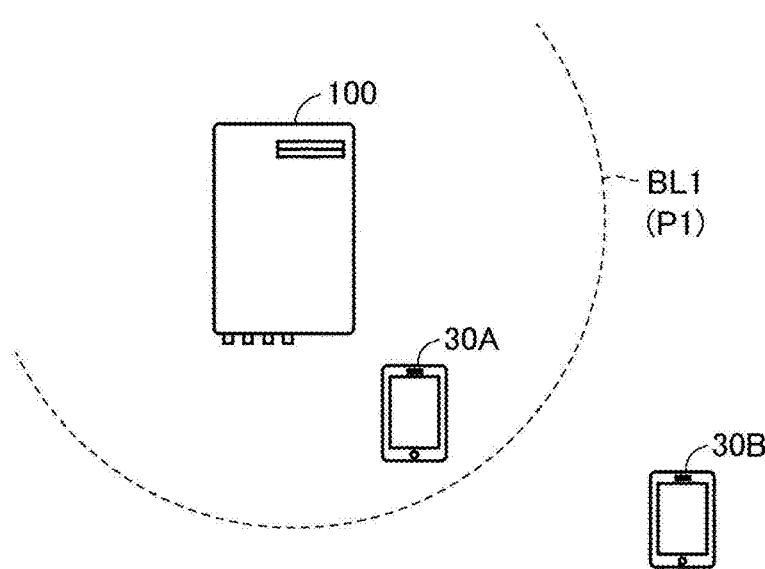
FIG. 4A and FIG. 4B are conceptual diagrams illustrating the control of the transmission output according to the control processing of FIG. 3.
Figure 4B:
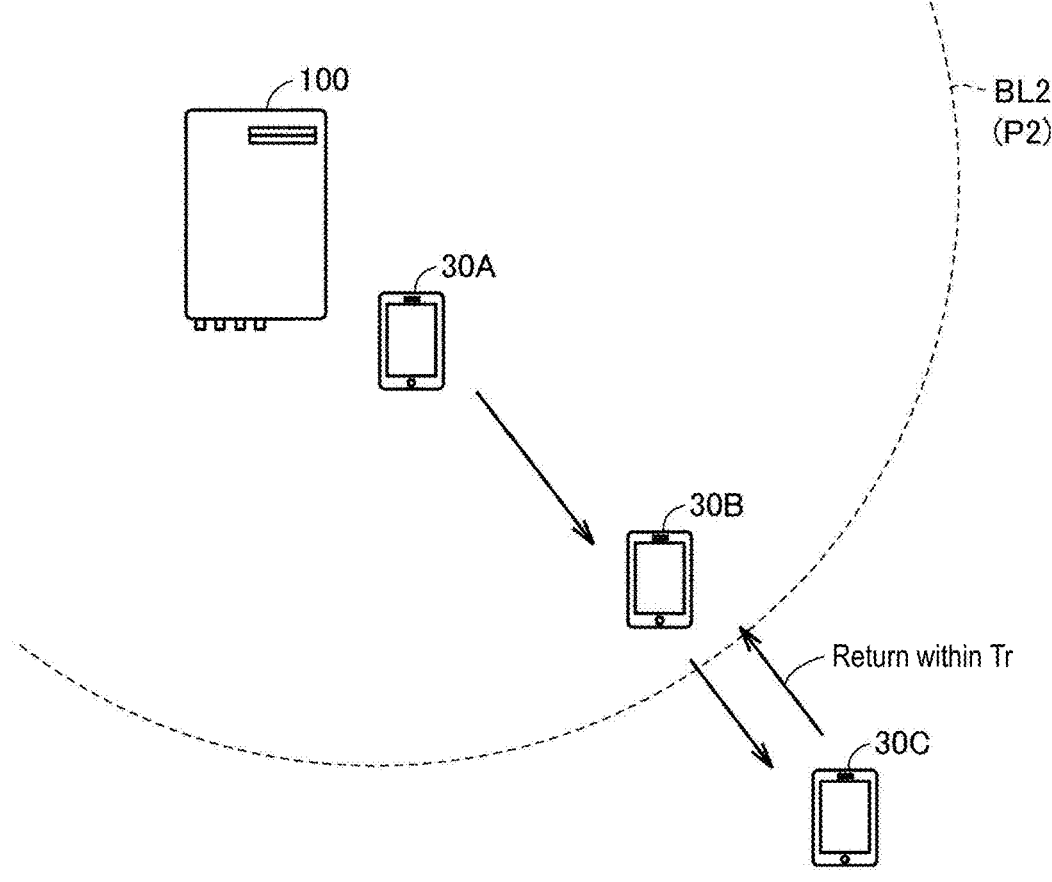

FIG. 3 is a flowchart illustrating the control processing for communication connection with the external device performed by the water heater according to this embodiment. Further, FIG. 4A and FIG. 4B show conceptual diagrams illustrating the control of the transmission output according to the control processing of FIG. 3. The control processing shown in FIG. 3 can be performed by the microcomputer 155.

Referring to FIG. 3, when the microcomputer 155 performs the initial setting (BLE setting) of the wireless communication part 160 in step (hereinafter simply referred to as "S") 110, the microcomputer 155 sets the BLE transmission output to the first output P1 in S120. The initial setting in S110 is performed when the water heater 100 is powered on and when the wireless communication part 160 is reset, and at this time, the BLE transmission output is also initialized to the first output P1.

The wireless communication part 160 outputs a BLE transmission signal with signal strength according to the BLE transmission output set by the microcomputer 155. Further, the wireless communication part 160 transmits information indicating whether there is communication connection with the external device including the mobile communication terminal 30 and the received signal strength indicator RSSI to the microcomputer 155.

After the initial setting of the wireless communication part 160, the microcomputer 155 causes the wireless communication part 160 to start advertising, which is a standby state for communication connection from the external device (mobile communication terminal 30), in S130. Thereby, the wireless communication part 160 is in a state of performing broadcast communication, that is, a state of being communicatively connectable with any external device within the range of radio waves (communicatively connectable range) under the BLE transmission output of the first output P1.

When the application software for communication connection with the water heater 100 is started, the mobile communication terminal 30 outputs a BLE communication connection request to the water heater 100 that is the transmission source of the BLE transmission signal in response to reception of the BLE transmission signal from the water heater 100.

Upon receiving the BLE communication connection request, the wireless communication part 160 establishes BLE communication connection with the mobile communication terminal 30 that transmits the BLE communication connection request. When the communication connection is established, the wireless communication part 160 notifies the microcomputer 155 of the same.

Thus, in the case where communication connection is established with an unpaired mobile communication terminal 30, the mobile communication terminal 30 is automatically authenticated and pairing information is transmitted and received, and thereafter, data is transmitted and received between the water heater 100 and the mobile communication terminal with encryption based on the pairing information.

In the case where communication connection is established with a paired mobile communication terminal 30, data is transmitted and received between the water heater 100 and the mobile communication terminal 30 with encryption based on the pairing information that has already been transmitted and received, without performing the pairing process again.

When the microcomputer 155 detects the BLE communication of the wireless communication part 160 based on the notification from the wireless communication part 160 (when it is determined as YES in S140), the processing proceeds to S150 to end the advertising of the wireless communication part 160, and the BLE transmission output is increased from the first output P1 to the second output P2 in S160. Thereby, the wireless communication part 160 is communicatively connected to the mobile communication terminal 30 with the BLE transmission output set to the second output P2.

After increasing the BLE transmission output to the second output P2, in S170, the microcomputer 155 confirms whether the once established BLE connection between the wireless communication part 160 and the mobile communication terminal 30 is disconnected. While the BLE connection continues, which is determined as NO in S170, the received signal strength indicator (RSSI) in the BLE communication transmitted from the wireless communication part 160 to the microcomputer 155 is monitored in S175.

When the microcomputer 155 detects disconnection of the BLE connection between the wireless communication part 160 and the mobile communication terminal 30 (when it is determined as YES in S170), the microcomputer 155 causes the wireless communication part 160 to start advertising in S180. Thereby, the wireless communication part 160 advertises with the BLE transmission output set to the second output P2.

Further, after the advertising of the wireless communication part 160 starts, the microcomputer 155 confirms in S190 whether reconnection with the mobile communication terminal 30 from which the BLE connection has been disconnected is detected, and confirms in S195 whether a reference time Tr has elapsed since the wireless communication part 160 starts advertising (S180).

When reconnection with the mobile communication terminal 30 is detected (when it is determined as YES in S190) before the reference time Tr elapses (when it is determined as NO in S195), the microcomputer 155 ends the advertising of the wireless communication part 160 in S200, and the processing returns to S170. Thereby, the BLE connection between the wireless communication part 160 and the mobile communication terminal 30 is restarted with the BLE transmission output set to the second output P2.

On the other hand, in the case where reconnection with the mobile communication terminal 30 is not detected even after the reference time Tr has elapsed (when it is determined as YES in S195), the microcomputer 155 decreases the BLE transmission output from the second output P2 to the first output P1 in S210. Thereby, the wireless communication part 160 advertises with the BLE transmission output set to the first output P1, similarly to after the initial setting (S120, S130).

In FIG. 4A, the communicable range BL1 when the BLE transmission output is the first output P1 is shown by a dotted line, while in FIG. 4B, the communicable range BL2 when the BLE transmission output is the second output P2 is shown by a dotted line. It is understood that the communicable range BL2 is wider than the communicable range BL1 in a manner that includes the communicable range BL1, depending on the magnitude of the BLE transmission output, that is, the transmission signal strength.

In FIG. 4A and FIG. 4B, the position 30A of the mobile communication terminal is within both the communicable range BL1 and the communicable range BL2. On the other hand, the position 30B of the mobile communication terminal is outside the communicable range BL1, but within the communicable range BL2.

After the initial setting in S120 and S130 in FIG. 3 and after the reference time Tr has elapsed since the BLE connection is disconnected in S210, only the mobile communication terminal 30 inside the communicable range BL1 shown in FIG. 4A can be communicatively connected to the water heater 100 (wireless communication part 160 during advertising).

That is, in the state of FIG. 4A, the mobile communication terminal 30 cannot be communicatively connected to the water heater 100 at the position 30B, and cannot establish communication connection with the water heater 100 unless the mobile communication terminal 30 approaches the position 30A. For example, the first output P1 can be set so that the communicable range BL1 covers the range of a distance of about 2 to 3 meters from the water heater 100.

On the other hand, once the mobile communication terminal 30 communicatively connected to the water heater 100 is inside the communicable range BL2 shown in FIG. 4B, it is possible to maintain communication connection with the water heater 100 (wireless communication part 160).

That is, in the state of FIG. 4B, after the mobile communication terminal 30 establishes communication connection with the water heater 100 at the position 30A (when it is determined as YES in S140 in FIG. 3), the communication connection with the water heater 100 can be maintained even if the mobile communication terminal 30 moves to the position 30B. For example, the second output P2 can be set so that the communicable range BL2 covers the range of a distance of about 10 meters from the water heater 100.

In FIG. 4B, when the mobile communication terminal 30 moves from the position 30B inside the communicable range BL2 to the position 30C outside the communicable range BL2, the communication connection between the mobile communication terminal 30 and the water heater 100 is disconnected. However, during the period from the disconnection until the reference time Tr has elapsed, the wireless communication part 160 advertises while maintaining the BLE transmission output at the second output P2.

Therefore, by returning from the position 30C to the position 30B within the reference time Tr, the mobile communication terminal 30 can be communicatively connected to the water heater 100 (wireless communication part 160 during advertising) again without returning to the inside of the communicable range BL1 before communication connection.

As described above, in the water heater according to this embodiment, the communicable range BL1 (FIG. 4A) before establishing communication connection with an external device (mobile communication terminal 30) is narrowed, which makes it possible to improve the security under short-range wireless communication (BLE communication) through pairing that does not involve inputting a passcode.

Further, after the communication connection is established, the communicable range BL2 (FIG. 4B) wider than the communicable range BL1 is set, and when the once established communication connection is disconnected, the communicable range BL2 is maintained to stand by for reconnection until the reference time Tr elapses, which makes it possible to improve the convenience of the communication connection.

As a result, it is possible to achieve both security and convenience by controlling the transmission output in short-range wireless communication with the water heater through pairing that does not involve inputting a passcode.

Figure 5:
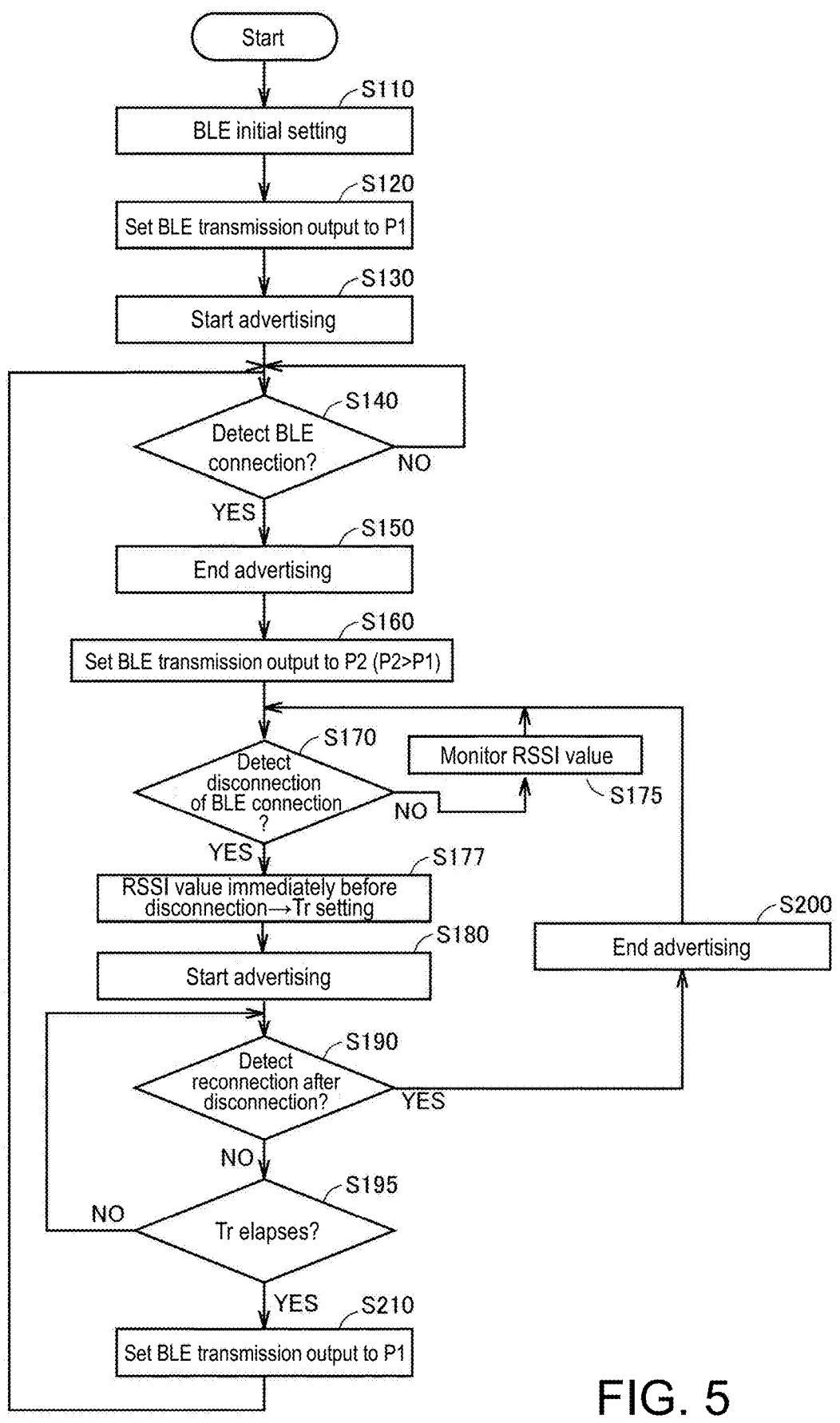
FIG. 5 is a flowchart illustrating the control of the transmission output according to a modified example of the control processing of FIG. 3.

FIG. 5 shows a modified example of the control processing shown in FIG. 3.

In the control processing of FIG. 5, when disconnection of the BLE connection between the wireless communication part 160 and the mobile communication terminal 30 is detected (when it is determined as YES in S170), the microcomputer 155 further performs the process in S177.

In S177, the microcomputer 155 obtains the received signal strength indicator immediately before the communication connection is disconnected from the received signal strength indicator (RSSI value) continuously monitored in S175, and sets the reference time Tr according to the received signal strength indicator immediately before the disconnection. Specifically, the reference time Tr is set variably by predicting the manner of disconnection of the communication connection from the mobile communication terminal 30 based on the received signal strength indicator immediately before the disconnection.

The BLE connection between the wireless communication part 160 and the mobile communication terminal 30 can be disconnected in response to a user operation such as ending the application software or turning off the power of the mobile communication terminal 30. In the case where the communication connection is disconnected in such a manner, the possibility of reconnection is low, so it is preferable to set the reference time Tr short considering security.

On the other hand, in the case where the signal strength becomes insufficient due to a change in the position of the mobile communication terminal 30 near the boundary of the communicable range BL2 in FIG. 4B, the BLE connection is disconnected regardless of the user's intention. In the case where the communication connection is disconnected in such a manner, the possibility of reconnection is high, so it is preferable to set the reference time Tr long considering user convenience.

In the case where the received signal strength indicator immediately before disconnection is high, it is presumed that the communication connection is disconnected in response to a user operation, that is, by the user's intention. Accordingly, the microcomputer 155 predicts that the possibility of reconnection is low and sets the reference time Tr short.

In contrast thereto, in the case where the received signal strength indicator immediately before disconnection is low, it is presumed that the communication connection is disconnected due to the radio wave condition or the position of the mobile communication terminal 30, rather than the user's intention. Therefore, the microcomputer 155 determines that the possibility of reconnection is high and sets the reference time Tr long.

By variably setting the reference time Tr (S195) in this way, it is possible to further balance the security and convenience when the once established communication connection is disconnected.

It should be noted that the short-range wireless communication between the external device (mobile communication terminal 30) and the water heater 100 is not limited to the BLE communication illustrated in this embodiment, and other communication systems such as Bluetooth (registered trademark) and Zigbee (registered trademark) may also be used.

The embodiments disclosed herein should be considered to be illustrative in all respects and not restrictive. The scope of the disclosure is defined by the claims rather than the above description, and is intended to include all changes within the meaning and scope equivalent to the claims.

What is claimed is:
1. A water heater, comprising:
a communication part for short-range wireless communication with an external device; and
a controller that controls transmission output of the short-range wireless communication performed by the communication part,
wherein the communication part is configured to automatically authenticate the external device to be connected in response to establishment of communication connection of the short-range wireless communication,
the controller sets the transmission output to first output before establishment of communication connection with the external device, and increases the transmission output from the first output to second output in response to communication connection with the external device being established, and further maintains the transmission output at the second output and stands by for reconnection with the external device until a reference time elapses in response to communication connection with the external device once communicatively connected being disconnected, and decreases the transmission output from the second output to the first output in a case where the reconnection is not established even after the reference time elapses.

2. The water heater according to claim 1, wherein the controller sets the transmission output to the first output in an initialization process of the communication part.

3. The water heater according to claim 1, wherein the communication part comprises a detection part that detects a received signal strength indicator in the short-range wireless communication, and the controller sets the reference time variably so that the reference time becomes short as the received signal strength indicator increases, according to the received signal strength indicator immediately before communication connection with the external device once communicatively connected is disconnected.

4. The water heater according to claim 1, wherein the external device is a mobile communication terminal, the mobile communication terminal is configured to output a communication connection request to the water heater in response to reception of a transmission signal of the short-range wireless communication from the communication part in a case where predetermined application software is started, and the communication part establishes communication connection with the mobile communication terminal that outputs the communication connection request in response to reception of the communication connection request.

5. The water heater according to claim 2, wherein the external device is a mobile communication terminal, the mobile communication terminal is configured to output a communication connection request to the water heater in response to reception of a transmission signal of the short-range wireless communication from the communication part in a case where predetermined application software is started, and the communication part establishes communication connection with the mobile communication terminal that outputs the communication connection request in response to reception of the communication connection request.

6. The water heater according to claim 3, wherein the external device is a mobile communication terminal, the mobile communication terminal is configured to output a communication connection request to the water heater in response to reception of a transmission signal of the short-range wireless communication from the communication part in a case where predetermined application software is started, and the communication part establishes communication connection with the mobile communication terminal that outputs the communication connection request in response to reception of the communication connection request.

* * * * *